United States Patent
Willard et al.

(10) Patent No.: US 12,304,386 B2
(45) Date of Patent: May 20, 2025

(54) POWER DISTRIBUTION BOX WITH A DISABLING CIRCUIT

(71) Applicant: Sumitomo Wiring Systems, Ltd., Yokkaichi (JP)

(72) Inventors: Eric Willard, Farmington Hills, MI (US); Vibhor Singh, Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 155 days.

(21) Appl. No.: 18/303,262

(22) Filed: Apr. 19, 2023

(65) Prior Publication Data

US 2024/0351517 A1    Oct. 24, 2024

(51) Int. Cl.
*B60Q 5/00*    (2006.01)
*B60R 16/023*    (2006.01)

(52) U.S. Cl.
CPC ............. *B60Q 5/001* (2013.01); *B60Q 5/005* (2013.01); *B60R 16/0238* (2013.01); *B60R 16/0239* (2013.01)

(58) Field of Classification Search
CPC .......... G08B 3/00; G08B 3/10; G08B 3/1025; G08B 3/1041; B60R 16/02; B60R 16/023; B60R 16/0231; B60R 16/0238; B60R 16/0239; B60Q 5/00; B60Q 5/001; B60Q 5/005
USPC ...................................................... 200/52 R
See application file for complete search history.

(56) References Cited

U.S. PATENT DOCUMENTS

| | | | |
|---|---|---|---|
| 7,956,728 B2 | 6/2011 | Kousaka et al. | |
| 9,296,334 B2 | 3/2016 | Hampiholi | |
| 9,457,714 B1 | 10/2016 | Lazarini | |
| 2015/0210232 A1* | 7/2015 | Kanzaki | H02H 7/18 701/36 |
| 2018/0281676 A1 | 10/2018 | Engineer | |

FOREIGN PATENT DOCUMENTS

| | | |
|---|---|---|
| CN | 108340832 A | 7/2018 |
| JP | 2011204163 A | 10/2011 |
| WO | 2020065923 A1 | 4/2020 |

\* cited by examiner

Primary Examiner — Anthony R Jimenez
(74) Attorney, Agent, or Firm — Honigman LLP

(57) ABSTRACT

A circuit for disabling an electric device stuck in an active state. The circuit includes a first input for receiving a first actuation signal from an external device and a second input for receiving a second actuation signal from a microcontroller. An output path is connected to the first input and the second input and transmits the first actuation signal and the second actuation signal to the electric device. A grounding path transmits the first actuation signal and the second actuation signal to ground. A first transistor is disposed on the grounding path and is configured to be activated by a first voltage potential. A first latching circuit is coupled to the battery and is configured to receive the pulsed signal from the microcontroller and ground the first actuation signal and the second actuation signal along the grounding path so as to disable the electric device.

20 Claims, 5 Drawing Sheets

POWER DISTRIBUTION BOX WITH A DISABLING CIRCUIT

TECHNICAL FIELD

This disclosure relates to a circuit for disabling an electric device and in particular a power distribution box with a circuit for disabling an electric device.

BACKGROUND

With reference now to FIG. 1, a schematic diagram of a power distribution box 200 is provided. The power distribution box 200 is configured to supply power from a battery 202 to various electric devices 204. In one aspect, the power distribution box is shown disposed in an automotive vehicle. The power distribution box 200 supplies power from the battery 202 to an electric device 204 of the vehicle.

The power distribution box 200 includes a microcontroller 206 configured to regulate power from the battery 202 to the electric device 204. An input 208, such as a button of a key fob, is configured to actuate the electric device 204. The microcontroller 206 is configured to process a signal from the input 208 to connect the electric device 204 to the battery 202 so as to power the electric device 204. An electronic controller 210 is provided for monitoring the state of the electric device 204, wherein the electronic controller 210 turns off the electric device 204 in the case that the input 208 is stuck in an ON position. The electronic controller 210 may control a switch (not shown) which turns the electric device 204 off. However, such a configuration adds costs and complexity.

As such, it remains desirable to have a power distribution box wherein the microcontroller is configured to disable the electric device from actuating.

SUMMARY

In one aspect, a circuit for disabling an electric device that is stuck in an active state is provided. The circuit may be disposed in a power distribution box configured to supply power from a battery to the electric device. The power distribution box includes a microcontroller configured to transmit a pulsed signal and an actuation signal for connecting the electric device to the battery.

The circuit includes a first input for receiving a first actuation signal from an external device. The first actuation signal is configured to actuate the electric device. The circuit includes a second input for receiving the actuation signal from the microcontroller for powering the electric device. The second input is connected in parallel with the first input at a first node.

The circuit further includes an output path and a grounding path. The output path is connected to the first input and the second input at a second node. The second node is downstream of the first node. The output path is configured to transmit the actuation signal to the electric device. The grounding path is connected to the first input and the second input at the first node and is parallel with the output path. The grounding path transmits the first actuation signal and the second actuation signal to ground so as to prevent the first actuation signal and the second actuation signal from reaching the electric device so as to disable the electric device.

The first transistor includes a base, a collector and an emitter. The first transistor is disposed on the grounding path and interposed between the first node and the ground. The first transistor is configured to be activated by a voltage potential between the base and the emitter.

The first latching circuit is coupled to a battery and is configured to receive the pulsed signal from the microcontroller and ground the first actuation signal and the second actuation signal from the first input and the second input along the grounding path so as to disable the electric device and retain the voltage potential between the base and emitter of the first transistor so as to keep the first transistor on and grounding the first and second actuation signals.

In one aspect, the circuit may further include a third input and a third diode connected in series with the third input. The third input receives the pulsed signal from the microcontroller, and the first diode is interposed between the third input and the first transistor.

In one aspect, the first latching circuit includes a second transistor, a third transistor and a first capacitor. The third transistor includes an emitter connected to the battery and a collector connected to ground. The pulsed signal charges the first capacitor and generates a voltage potential between a base of the second transistor and an emitter of the second capacitor turning on the second transistor. When the second transistor is turned on, a first electric path is created from the battery to ground so as to create a voltage potential between a base of the third transistor and an emitter of the third transistor, turning on the third transistor. When the third transistor is turned on, a second electric path is created from the battery to ground, wherein the first capacitor is charged and retains the voltage potential between the base and emitter of the first transistor keeping the first transistor on. When the first transistor is on, the first and second actuation signals are grounded.

In one aspect, the circuit further includes a second capacitor interposed between the emitter of the third transistor and the collector of the second transistor. In such an aspect, the third transistor includes a pair of first biasing resistors connected in parallel with each other and the base of the third transistor.

In one aspect, the circuit may further include a fourth input for receiving the pulsed signal from the microcontroller and a second latching circuit. The second latching circuit is configured to process the pulsed signal to turn off the first transistor.

In one aspect, the second latching circuit may include a fourth transistor and a fifth transistor. The fifth transistor includes an emitter coupled to the battery, a collector coupled to ground and a base coupled to the fourth transistor. The fourth transistor includes a base configured to receive the pulsed signal so as to generate a voltage potential between the base and an emitter of the fourth transistor, turning on the fourth transistor. When the fourth transistor is turned on, a third electric path is created for grounding the battery and generating a voltage potential between the emitter of the fifth transistor and the base of the fifth transistor turning on the fifth transistor and turning off the first transistor, the second transistor and the third transistor.

In one aspect, the fifth transistor may include a pair of second biasing resistors connected in parallel with each other and the base of the fifth transistor.

In another aspect, the second latching circuit includes a first voltage divider interposed between the fourth input and the fourth transistor.

A power distribution box for distributing power from a battery to an electric device is also provided. The power distribution box includes a first input, a microcontroller and a second input. The first input is configured to receive a first actuation signal from an external device. The first actuation signal is configured to actuate the electric device. The microcontroller is configured to transmit a pulsed signal and a second actuation signal. The second actuation signal is configured to provide power to the electric device. The second input is configured to receive a second actuation signal from the microcontroller for actuating a relay connecting the electric device to the battery. The second input is connected in parallel with the first input at a first node.

The power distribution box further includes a disabling circuit. The disabling circuit is configured to disable an electric connection to the electric device. The disabling circuit includes a first input, a second input, an output path, a grounding path, a first transistor, and a first latching circuit. The output path is connected to the first input and the second input at a second node downstream of the first node. The output path transmits the actuation signal to the electric device. The grounding path is connected to the first input and the second input at the first node and is parallel with the output path. The grounding path transmits the first actuation signal and the second actuation signal to ground.

The first transistor includes a base, a collector and an emitter. The first transistor is disposed on the grounding path and interposed between the first node and the ground. The first transistor is configured to be activated by a voltage potential between the base and the emitter so as to connect the grounding path to ground.

The first latching circuit is coupled to the battery. The first latching circuit is configured to receive the pulsed signal from the microcontroller and ground the first actuation signal and the second actuation signal from the first input and the second input along the grounding path so as to disable the electric device and retain the voltage potential between the base and emitter of the first transistor so as to keep the first transistor on.

In one aspect, the power distribution box may further include a third input and a first diode. The third input is configured to receive the pulsed signal from the microcontroller and the first diode is interposed between the third input and the first transistor.

In one aspect, the first latching circuit may include a second transistor, a third transistor and a first capacitor. The third transistor includes an emitter connected to the battery and a collector connected to ground. The pulsed signal charges the first capacitor. When the first capacitor is charged, a voltage potential is generated between a base of the second transistor and an emitter of the second capacitor turning on the second transistor. When the second transistor is turned on, a first electric path is created from the battery to ground so as to generate a voltage potential between a base of the third transistor and an emitter of the third transistor, turning on the third transistor. When the third transistor is turned on, a second electric path is created from the battery to ground, wherein the first capacitor is charged again, and the voltage potential between the base and emitter of the first transistor is retained, keeping the first transistor on.

In one aspect, the power distribution box may further include a second capacitor interposed between the emitter of the third transistor and the collector of the second transistor. In such an aspect, the third transistor includes a pair of first biasing resistors connected in parallel with each other and the base of the third transistor.

In one aspect, the power distribution box may further include a fourth input and a second latching circuit. The fourth input is configured to receive the pulsed signal from the microcontroller. The second latching circuit is configured to process the pulsed signal to turn off the first transistor.

In one aspect, the second latching circuit may include a fourth transistor and a fifth transistor. The fifth transistor includes an emitter coupled to the battery, a collector coupled to ground and a base coupled to the fourth transistor. The base of the fourth transistor is configured to receive the pulsed signal so as to generate a voltage potential between the base and an emitter of the fourth transistor, turning on the fourth transistor. When the fourth transistor is turned on, a third electric path is created. The third electric path grounds the battery and generates a voltage potential between the emitter of the fifth transistor and the base of the fifth transistor, turning on the fifth transistor, turning off the first transistor, the second transistor and the third transistor.

In one aspect, the fifth transistor includes a pair of second biasing resistors connected in parallel with each other and the base of the fifth transistor. In such an aspect, the second latching circuit includes a first voltage divider interposed between the fourth input and the fourth transistor.

DESCRIPTION OF DRAWINGS

The drawings described herein are for illustrative purposes only of selected configurations and are not intended to limit the scope of the present disclosure.

DETAILED DESCRIPTION OF PREFERRED EMBODIMENTS

A power distribution box having a circuit disabling an electric device by using a pulse signal is provided. The power distribution box is configured to receive an input from an external device to actuate an electric device. A microcontroller is configured to transmit a signal to provide power from a battery to the electric device. The circuit processes a pulsed signal from the microcontroller so as to retain a voltage potential between a base of a transistor and an emitter of a transistor so as to keep the transistor on, wherein when the transistor is on a grounding path is created which directs power intended to power the electric device to ground.

Figure 1:
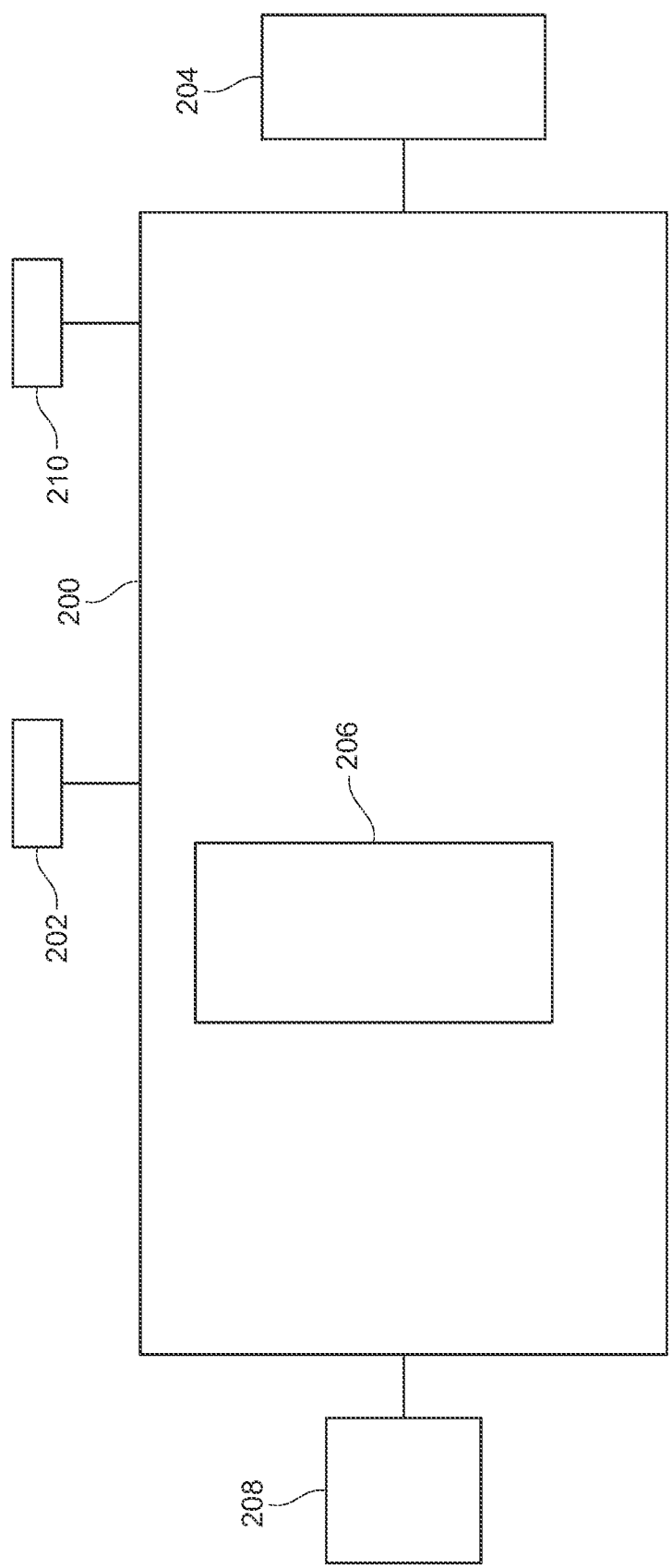
FIG. 1 is a schematic view of a conventional power distribution box.
Figure 2:
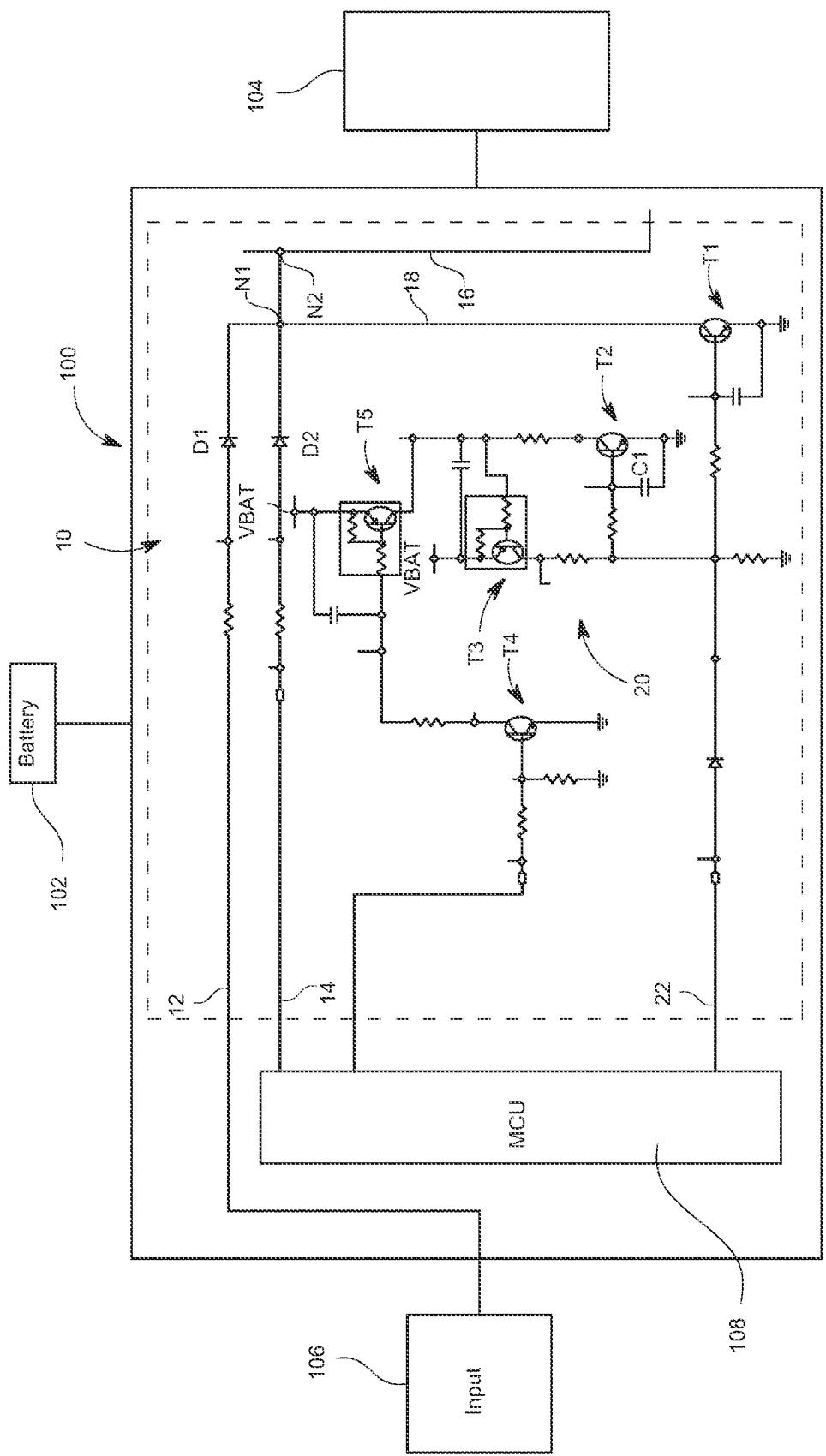
FIG. 2 is an illustrative schematic view of a power distribution box according to one or more aspects described herein.

With reference now to FIG. 2, an illustrative depiction of a power distribution box 100 is provided. The power distribution box 100 may be disposed in an automotive vehicle (not shown) and is configured to supply power from a battery 102 to an electric device 104. The power distribution box 100 may be configured to receive an input from an external device 106 (e.g. a device external to the power distribution box 100) to control the electric device 104. For instance, the power distribution box 100 may be configured to receive a signal from the external device 106, such as a key fob.

The power distribution box 100 includes a microcontroller 108 for transmitting a signal to turn on a relay (not shown) which connects the electric device 104 to the battery 102. The microcontroller 108 is further configured to send a pulse signal for disabling the connection of the electric device 104 to the battery 102 so as to disable the electric device 104. It should be appreciated that in the event the input of the external device 106 is stuck in an ON position, the signal is continuously transmitted to the electric device 104, and the microcontroller 108 retains the relay in the ON position.

The microcontroller 108 is programmed to disable the electric device 104 using a pulsed signal upon detecting a predetermined condition. Upon detecting the predetermined condition, the microcontroller 108 transmits the pulse signal to disable the electric device 104. In one aspect, the predetermined condition may be a condition where the second actuation signal is transmitted continuously over a predetermined period of time, which indicates that the button is stuck in the ON position. The microcontroller 108 is also programmed to enable the electric device 104 after the electric device 104 has been disabled using a pulse signal.

With reference now to FIG. 2, an illustrative schematic depiction of the power distribution box 100 is provided, showing the microcontroller 108 coupled to a disabling circuit 10. The disabling circuit 10 includes a first input 12 for receiving a first actuation signal from an external device 106. The first input 12 is an electric line, such as a conductive trace of a circuit board, and receives a first actuation signal which may be transmitted from a key fob and routed to the first input 12 using known techniques which are beyond the scope of this disclosure. The first actuation signal is configured to actuate the electric device 104. As an example, the first actuation signal may include command controls for actuating the electric device 104. In one aspect, the first input 12 includes a first resistor (R1) disposed in series with a first diode (D1). The first diode (D1) has a cathode that prevents a back current from the electric device 104 to the first input 12.

The disabling circuit 10 includes a second input 14 for receiving the actuation signal from the microcontroller 108 for powering the electric device 104. The second input 14 is connected in parallel with the first input 12 at a first node (N1). The second actuation signal is a pulsed signal configured to turn on a relay (not shown) which connects the battery 102 to the electric device 104 so as to provide power to the electric device 104. In one aspect, the second input 14 includes a second resistor (R2) disposed in series with a second diode (D2). The second diode (D2) has a cathode that prevents a back current from the electric device 104 to the second input 14.

Figure 3:
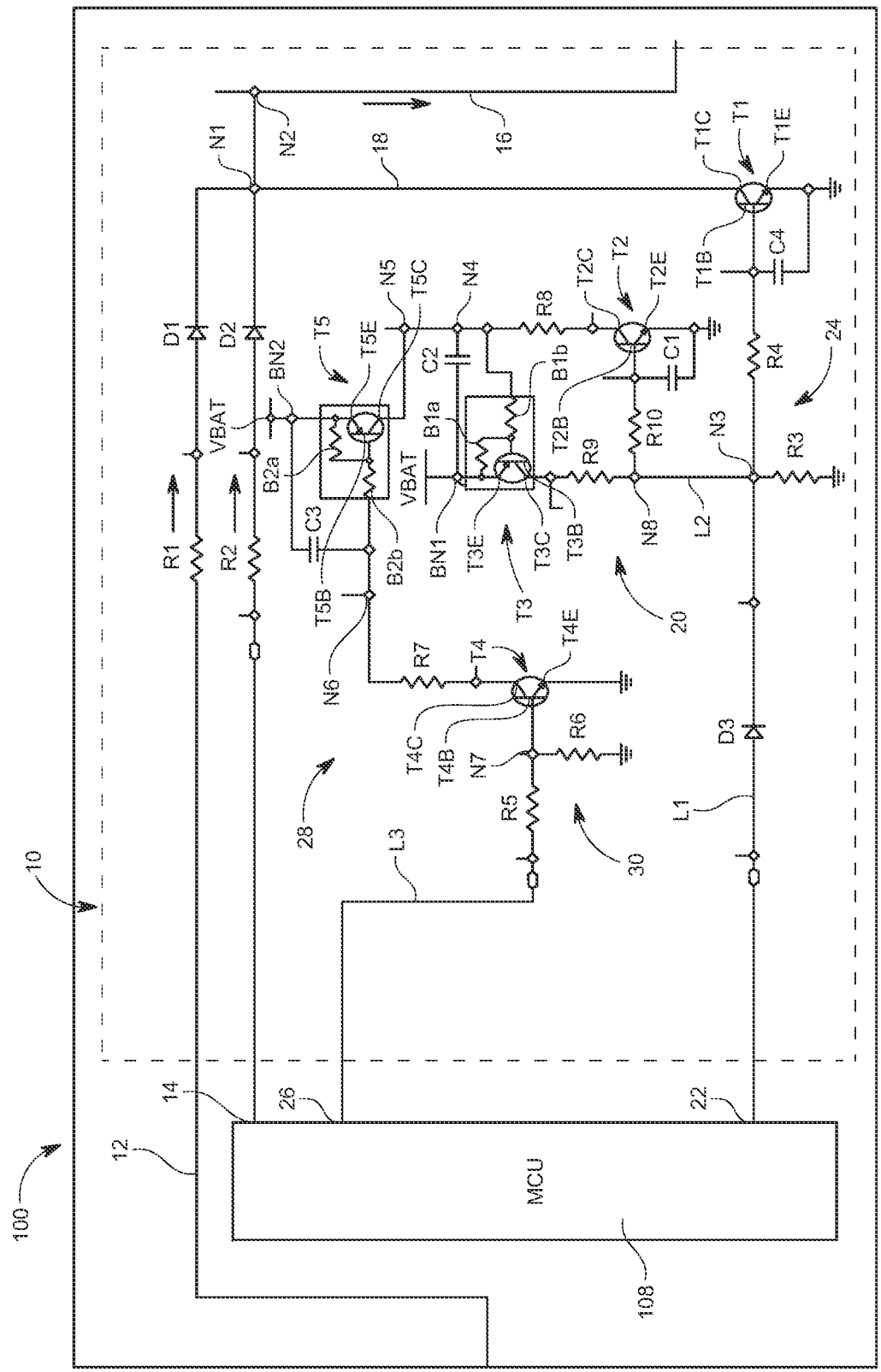
FIG. 3 is an illustrative schematic view of the wake-up circuit shown in FIG. 2, showing the second electric device operating.

With reference now to FIG. 3, an illustrative description of the disabling circuit 10 is provided. The disabling circuit 10 further includes an output path 16 and a grounding path 18. The output path 16 is connected to the first input 12 and the second input 14 at a second node (N2). The second node (N2) is downstream of the first node (N1) wherein the first node (N1) is interposed between the second node (N2) and the electric device 104. The output path 16 is configured to transmit the first and second actuation signals from the first input 12 and the second input 14 to the electric device 104.

The grounding path 18 is connected to the first input 12 and the second input 14 at the first node (N1) and is in parallel with the output path 16. The grounding path 18 transmits the first actuation signal and the second actuation signal to ground so as to prevent the first actuation signal and the second actuation signal from reaching the electric device 104 thereby disabling the electric device 104.

The grounding path 18 includes a first transistor (T1). The first transistor (T1) includes a base (T1B), a collector (T1C) and an emitter (T1E). The first transistor (T1) is disposed on the grounding path 18 and interposed between the first node (N1) and the ground. The first transistor (T1) is configured to be activated by a voltage potential between the base (T1B) and the emitter (T1E). In one aspect, the first transistor (T1) is commonly referred to as an NPN transistor.

The disabling circuit 10 further includes a first latching circuit 20. The first latching circuit 20 is coupled to the battery 102 at a first battery node (BN1) and is also coupled to the microcontroller 108. The first latching circuit 20 is configured to receive the pulsed signal from the microcontroller 108 and ground the first actuation signal and the second actuation signal from the first input 12 and the second input 14 along the grounding path 18 so as to disable the electric device 104. The first latching circuit 20 is further configured to retain the voltage potential between the base (T1B) and emitter (T1E) of the first transistor (T1) so as to keep the first transistor (T1) on, continuously grounding the first and second actuation signals.

The disabling circuit 10 may further include a third input 22 connected to the microcontroller 108 and a third diode (D3) connected in series with the third input 22. The third input 22 receives the pulsed signal from the microcontroller 108 and is coupled to electric line (L1) connecting the third input 22 to the first transistor (T1). The third diode (D3) is interposed between the third input 22 and the first transistor (T1) along electric line (L1) and has a cathode facing the grounding path 18 so as to prevent a back current from reaching the microcontroller 108. A first voltage divider 24 is connected to electric line (L1) at a third node (N3) and is interposed between the third diode (D3) and the first transistor (T1). The first voltage divider 24 includes a third resistor (R3) and a fourth resistor (R4). The third resistor (R3) is connected to electric line (L1) on one end and ground on the other end. The fourth resistor (R4) is interposed between the third node (N3) and the first transistor (T1).

The first latching circuit 20 is disposed on electric line (L2) and includes a second transistor (T2), a third transistor (T3), a first capacitor (C1) and a second capacitor (C2) which are electrically coupled to each other. The second transistor (T2) is what is commonly referred to as an NPN transistor. The third transistor (T3) is what is commonly referred to as a PNP transistor. Electric line (L2) is connected to and in parallel with electric line (L1) at the third node (N3). The third transistor (T3) includes an emitter (T3E) connected to the battery 102 and a collector (T3C) connected to ground. The base (T3B) of the third transistor (T3) is connected to a fourth node (N4) that is interposed between the first capacitor (C1) and the second transistor (T2).

The first capacitor (C1) is disposed on an electric line connecting the base (T2B) of the second transistor (T2) with the emitter (T2E) of the second transistor (T2) and is electrically coupled to the third input 22 and the third transistor (T3) by an electric line, as such the first capacitor (C1) may be charged by either the pulse signal or the battery 102. The second transistor (T2) is interposed between the first capacitor (C1) and the first battery node (BN1). In particular, the collector (T2C) of the second transistor (T2) is connected to the first battery node (BN1 so as to receive a voltage from the battery 102. The emitter (T2E) of the second transistor (T2) is connected to ground. As such, when the second transistor (T2) is turned on, voltage from the battery 102 is grounded.

The second capacitor (C2) is interposed between the emitter (T3E) of the third transistor (T3) and the collector (T2C) of the second transistor (T2). In particular, the second capacitor (C2) is disposed on a portion of the second electric line (L2) that extends between the first battery node (BN1) and the fourth node (N4). Thus, when the second transistor (T2) is turned on, the battery 102 charges the second capacitor (C2), wherein the second capacitor (C2) discharge is also grounded.

Figure 4:
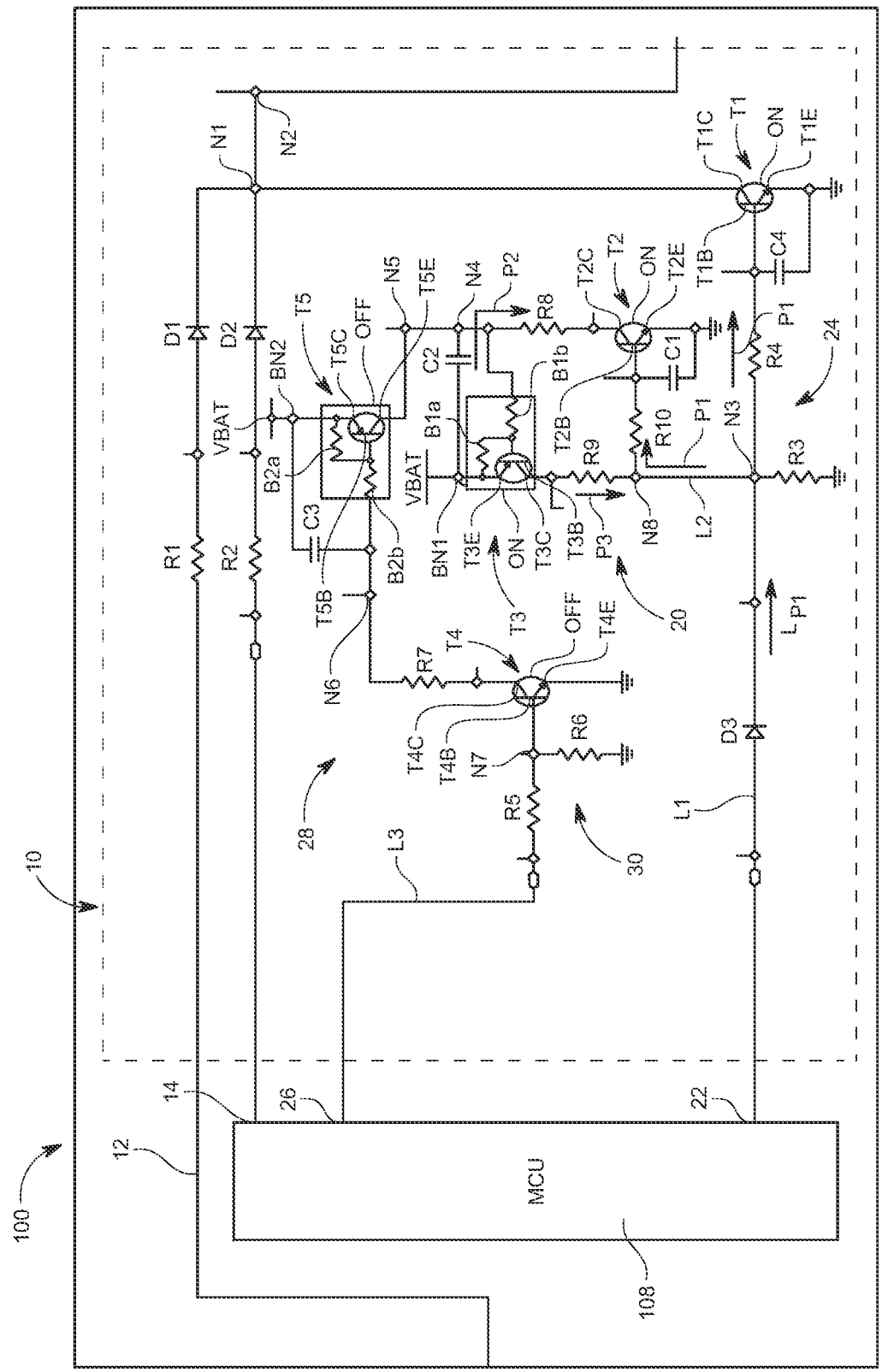
FIG. 4 is an illustrative schematic view of the wake-up circuit shown in FIG. 2, showing the first electric device operating.
Figure 5:
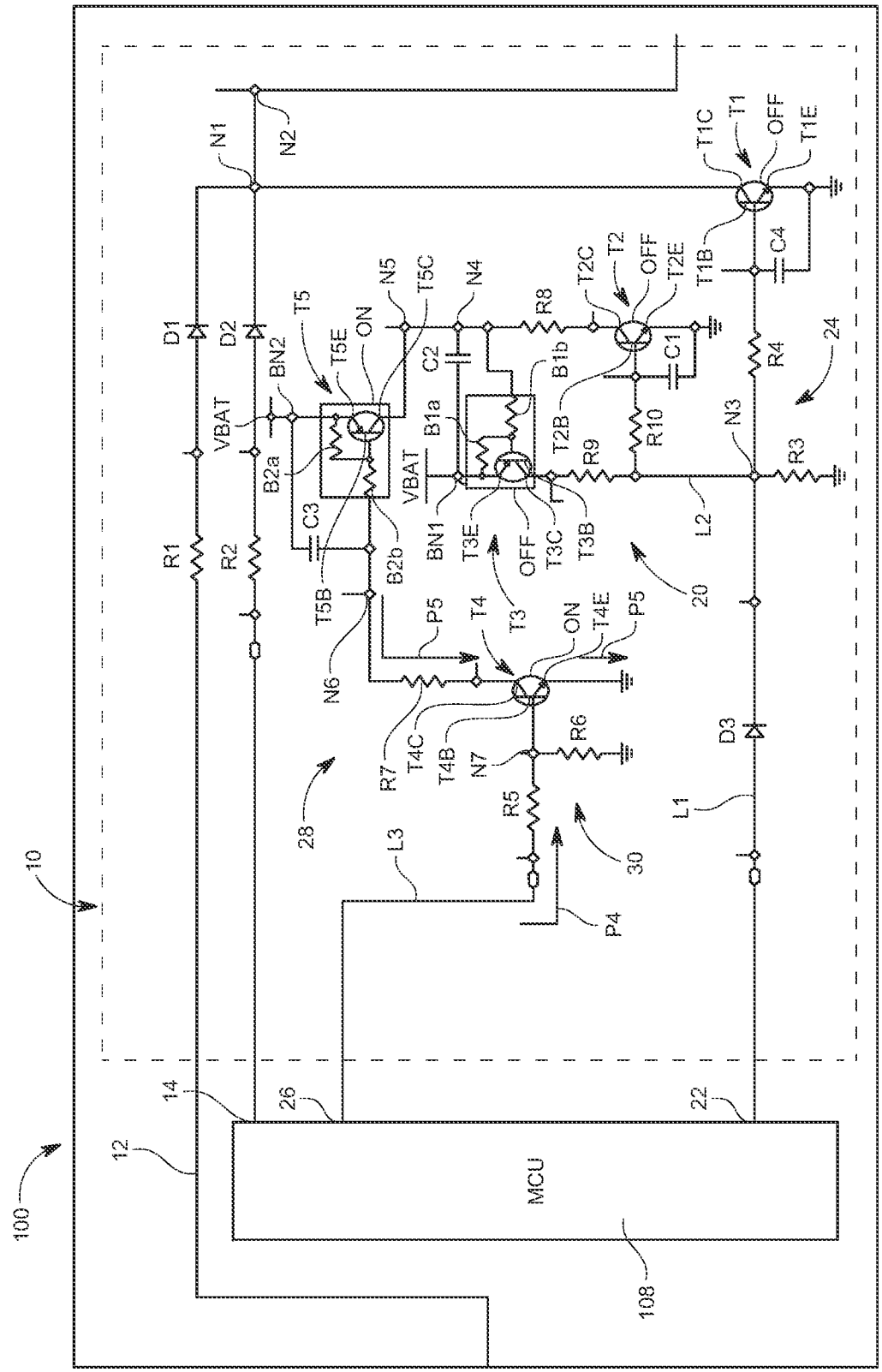
FIG. 5 is an illustrative schematic view of the wake-up circuit shown in FIG. 2, showing the state determination circuit operating.

As shown in FIGS. 3-5, the third transistor (T3) may include a pair of first biasing resistors (B1a, B1b). The first biasing resistors (B1a, B1b) are connected in series with each other and are connected to the base (T3B) of the third transistor (T3). The first biasing resistors (B1a, B1b) are configured to drop a voltage from the battery 102 and the emitter (T3E) to the base (T3B) of the third transistor (T3). In particular, when the second transistor (T2) is turned on, voltage from the battery 102 is grounded through the second transistor (T2) and voltage from the battery 102 is drawn through the first biasing resistors (B1a, B1b), dropping the voltage at each of the first biasing resistors (B1a, B1b), changing the voltage potential between the emitter (T3E) and the base (T3B) so as to turn on the third transistor (T3).

The disabling circuit 10 may further include a fourth input (26) for receiving the pulsed signal from the microcontroller 108. The first input 12 is connected to electric line (L3) and is configured to transmit the pulsed signal to a second latching circuit 28. The second latching circuit 28 is coupled to the first latching unit at a fifth node (N5), where electric line (L3) and electric line (L2) connect. The second latching circuit 28 is configured to process the pulsed signal from the microcontroller 108 to turn off the first transistor (T1).

In one aspect, the second latching circuit 28 may include a fourth transistor (T4) and a fifth transistor (T5). The fourth transistor (T4) is what is commonly referred to as an NPN transistor. The fifth transistor (T5) is what is commonly referred to as a PNP transistor. The fourth transistor (T4) is interposed between the fourth input (26) and the fifth transistor (T5). The fifth transistor (T5) includes an emitter (T5E) coupled to the battery 102, a collector (T5C) coupled to ground, and a base (T5B) coupled to the fourth transistor (T4). Thus, when the fifth transistor (T5) is turned off, a voltage at a sixth node (N6) is the same as the voltage of the battery 102 and since the voltage at the base (T5B) of the fifth transistor (T5) is the same as the voltage of the emitter (T5E) of the fifth transistor (T5), the fifth transistor (T5) stays off. When the fourth transistor (T4) is turned on, the voltage of the battery 102 is grounded.

The fourth transistor (T4) includes a base (T4B) configured to receive the pulsed signal so as to generate a voltage potential between the base (T4B) and an emitter (T4E) of the fourth transistor (T4) and turns on the fourth transistor (T4). When the fourth transistor (T4) is turned on, an electric path is created for grounding the battery 102 at a second battery node (BN2). When the battery 102 is grounded along the electric path, a voltage potential is generated between the emitter (T5E) of the fifth transistor (T5) and the base (T5B) of the fifth transistor (T5), turning on the fifth transistor (T5) and turning off the first transistor (T1), the second transistor (T2) and the third transistor (T3).

The fifth transistor (T5) may include a pair of second biasing resistors (B2a, B2b) connected in series with each other and the base of the fifth transistor (T5). The second biasing resistors (B2a, B2b) are configured to drop a voltage from the battery 102 and the emitter (T5E) to the base (T5B) of the fifth transistor (T5), changing the voltage potential between the emitter (T5E) and the base (T5B) so as to turn on the fifth transistor (T5).

With reference now to FIG. 3, the disabling circuit 10 is shown in a non-operative mode wherein the first latching circuit 20 is turned off, and the first transistor (T1) is open. When the first transistor (T1) is open, the first actuation signal from the external device 106 and the second actuation from the microcontroller 108 are transmitted along the output path 16 so as to power and actuate the electric device 104.

With reference now to FIG. 4, an operation of the first latching circuit 20 is provided. The pulsed signal is transmitted along a first electric path (P1), turns on the first transistor (T1), and charges the first capacitor (C1). When the first capacitor (C1) is charged, a voltage potential is generated between a base of the second transistor (T2) and an emitter of the second capacitor (C2), turning on the second transistor (T2). When the second transistor (T2) is turned on, a second electric path is (P2) created from the battery 102 to ground so as to create a voltage potential between a base of the third transistor (T3) and an emitter of the third transistor (T3), turning on the third transistor (T3). When the third transistor (T3) is turned on, a third electric path (P3) is created from the battery 102 to ground, wherein the first capacitor (C1) is charged and retains the voltage potential between the base and emitter of the first transistor (T1) keeping the first transistor (T1) on. When the first transistor is on, the first and second actuation signals are grounded.

With reference now to FIG. 5, an operation of the second latching circuit 28 is provided. The microcontroller 108 transmits a pulse signal along a fourth electric path (P4) which turns on the fourth transistor (T4), wherein the voltage from the battery 102 is grounded. When the fourth transistor (T4) is on, a fifth electric path (P5) is created between the battery 102 and ground through the fourth transistor (T4), and a voltage potential is generated between the emitter (T5E) and the base (T5B) of the fifth transistor (T5) turning on the fifth transistor (T5). When the fifth transistor (T5) is turned on, the voltage at the fourth node (N4) is equal to the voltage at the first battery node (BN1), thus the voltage at the emitter (T3E) and the base (T3B) of the third transistor (T3) is the same, and the third transistor (T3) is turned off. When the third transistor (T3) is turned off, the first capacitor (C1) and the fourth capacitor (C4) are allowed to discharge to ground turning off the first transistor (T1) and the second transistor (T2).

With reference again to FIGS. 2-5, a power distribution box 100 for distributing power from a battery 102 to an electric device 104 is also provided. For illustrative purposes, the electric device 104 is a horn which may be actuated from an external device 106, such as a key fob. The power distribution box 100 includes a first input 12, a microcontroller 108 and a second input 14. The first input 12 is configured to receive a first actuation signal from the external device 106. When the external device 106 (for use herein, the term "external" refers to a device located outside of the power distribution box 100) transmits the first actuation signal, the first actuation signal is transmitted to the electric device 104 to actuate a relay which connects the horn to the battery 102. The microcontroller 108 may also be configured to actuate the relay to connect the horn to the battery 102. In such an aspect, the microcontroller 108 may receive an actuation signal from a key FOB, wherein the microcontroller 108 processes the actuation signal to transmit a pulse signal (e.g. a second actuation signal) to actuate a relay which connects the horn to the battery 102.

The microcontroller 108 is programmed to monitor both the first input 12 and the second input 14 wherein a continuous transmission of a pulse signal over a predetermined period of time is processed by the microcontroller 108 to determine that key fob is stuck in an ON position. For instance, if a signal (e.g. first actuation signal and second actuation signal) is continuously transmitted for thirty (30) seconds, the microcontroller 108 determines that the key fob is stuck in an ON position. The microcontroller 108 is also programmed to disable and enable the electric device 104 (e.g. the horn).

The power distribution box 100 includes a disabling circuit 10 having a first input 12 for receiving the first actuation signal and a second input 14 for receiving the second actuation signal from the microcontroller 108. The second input 14 is connected in parallel with the first input 12 at a second node (N2) and an output path 16 connects the second node (N2) to the horn. The first input 12 may include a first resistor (R1) disposed in series with a first diode (D1) and the second input 14 may include a second resistor (R2) disposed in series with a second diode (D2). The first diode (D1) and the second diode (D2) have a cathode that prevents a back current from the electric device 104 to the respective first input 12 and second input 14.

The disabling circuit 10 further includes a grounding path 18. The grounding path 18 is connected to the first input 12 and the second input 14 at the first node (N1) and is in parallel with the output path 16. The grounding path 18 transmits the first actuation signal and the second actuation signal to ground so as to prevent the first actuation signal and the second actuation signal from reaching the electric device 104, disabling the electric device 104.

The first transistor (T1) includes a base (T1B), a collector (T1C) and an emitter (T1E). The first transistor (T1) is disposed on the grounding path 18 and interposed between the first node (N1) and the ground. The first transistor (T1) is configured to be activated by a voltage potential between the base and the emitter. In one aspect, the first transistor (T1) is what is commonly referred to as an NPN transistor.

The disabling circuit 10 further includes a first latching circuit 20. The first latching circuit 20 is coupled to the battery 102 at a first battery node (BN1) and also coupled to the microcontroller 108. The first latching circuit 20 is configured to receive the pulsed signal from the microcontroller 108 and ground the first actuation signal and the second actuation signal from the first input 12 and the second input 14 along the grounding path 18 so as to disable the electric device 104. The first latching circuit 20 is further configured to retain the voltage potential between the base and emitter of the first transistor (T1) so as to keep the first transistor (T1) on, continuously grounding the first and second actuation signals.

The disabling circuit 10 may further include a third input 22 connected to the microcontroller 108 and a third diode (D3) connected in series with the third input 22. The third input 22 receives the pulsed signal from the microcontroller 108 and is coupled to electric line (L1) connecting the third input 22 to the first transistor (T1). The third diode (D3) is interposed between the third input 22 and the first transistor (T1) along electric line (L1) and has a cathode facing the grounding path 18 so as to prevent a back current from reaching the microcontroller 108.

A first voltage divider 24 is connected to electric line (L1) at a third node (N3) and is interposed between the third diode (D3) and the first transistor (T1). The first voltage divider 24 includes a third resistor (R3) and a fourth resistor (R4). The third resistor (R3) is connected to electric line (L1) on one end and ground on the other end. The fourth resistor (R4) is interposed between the third node (N3) and the first transistor (T1).

The first latching circuit 20 is disposed on electric line (L2) and includes a second transistor (T2), a third transistor (T3) and a first capacitor (C1) which are electrically coupled to each other. The second transistor (T2) is what is commonly referred to as an NPN transistor. The third transistor (T3) is what is commonly referred to as a PNP transistor. Electric line (L2) is connected to and in parallel with electric line (L1) at the third node (N3). The third transistor (T3) includes an emitter (T3E) connected to the battery 102 and a collector (T3C) connected to ground. The base (T3B) of the third transistor (T3) is connected to a fourth node (N4).

The first capacitor (C1) is disposed on an electric line connecting the base (T2B) of the second transistor (T2) with the emitter (T2E) of the second transistor (T2) and is electrically coupled to the third input 22 and the third transistor (T3) by an electric line, as such the first capacitor (C1) may be charged by either the pulse signal or the battery 102. The second transistor (T2) is interposed between the first capacitor (C1) and the first battery node (BN1). In particular, the collector (T2C) of the second transistor (T2) is connected to the first battery node (BN1) so as to receive a voltage from the battery 102. The emitter (T2E) of the second transistor (T2) is connected to ground. As such, when the second transistor (T2) is turned on, the voltage from the battery 102 is grounded.

The first latching circuit 20 may further include a second capacitor (C2) interposed between the emitter (T3E) of the third transistor (T3) and the collector (T2C) of the second transistor (T2). In particular, the second capacitor (C2) is disposed on a portion of the second electric line (L2) that extends between the first battery node (BN1) and the fourth node (N4). Thus, when the second transistor (T2) is turned on, the battery 102 charges the second capacitor (C2), wherein the second capacitor (C2) discharge is also grounded.

The third transistor (T3) may include a pair of first biasing resistors (B1a, B1b). The first biasing resistors (B1a, B1b) are connected in series with each other and are connected to the base (T3B) of the third transistor (T3). The first biasing resistors (B1a, B1b) are configured to draw a voltage from the battery 102 and the emitter (T3E) to the base (T3B) of the third transistor (T3), changing the voltage potential between the emitter (T3E) and the base (T3B) so as to turn on the third transistor (T3).

The disabling circuit 10 may further include a fourth input (26) for receiving the pulsed signal from the microcontroller 108. The fourth input (26) is connected to electric line (L3) and is configured to transmit the pulsed signal to a second latching circuit 28. The second latching circuit 28 is coupled to the first latching unit at a fifth node (N5), where electric line (L3) and electric line (L2) connect. The second latching circuit 28 is configured to process the pulsed signal from the microcontroller 108 to turn off the first transistor (T1).

In one aspect, the second latching circuit 28 may include a fourth transistor (T4) and a fifth transistor (T5). The fourth transistor (T4) is what is commonly referred to as an NPN transistor. The fifth transistor (T5) is what is commonly referred to as a PNP transistor. The fourth transistor (T4) is interposed between the fourth input (26) and the fifth transistor (T5). The fifth transistor (T5) includes an emitter (T5E) coupled to the battery 102, a collector (T5C) coupled to ground and a base (T5B) coupled to the fourth transistor (T4). Thus, when the fifth transistor (T5) is turned off, a voltage at a sixth node (N6) is the same as the voltage of the battery 102 and since the voltage at the base (T5B) of the fifth transistor (T5) is the same as the voltage of the emitter (T5E) of the fifth transistor (T5), the fifth transistor (T5) stays off. When the fourth transistor (T4) is turned on, the voltage of the battery 102 is grounded.

The fourth transistor (T4) includes a base (T4B) configured to receive the pulsed signal so as to generate a voltage potential between the base (T4B) and an emitter (T4E) of the fourth transistor (T4) and turns on the fourth transistor (T4). When the fourth transistor (T4) is turned on, a fifth electric path is created for grounding the battery 102 along electric line (P5) to ground. When the battery 102 is grounded along the fifth electric path, a voltage potential is generated between the emitter (T5E) of the fifth transistor (T5) and the base (T5B) of the fifth transistor (T5) turning on the fifth transistor (T5) and turning off the first transistor (T1), the second transistor (T2) and the third transistor (T3).

The fifth transistor (T5) may include a pair of second biasing resistors (B2a, B2b) connected in series with each other and the base of the fifth transistor (T5). The second biasing resistors (B2a, B2b) are configured to drop a voltage from the battery 102 and the emitter (T5E) to the base (T5B) of the fifth transistor (T5). In particular, when the fourth transistor (T4) is turned on, voltage from the battery is grounded through the fifth transistor (T5) wherein voltage is drawn through each of the second biasing resistors (B2a, B2b) lowering the voltage at each of the second biasing resistors (B2a, B2b), changing the voltage potential between the emitter (T5E) and the base (T5B) so as to turn on the fifth transistor (T5).

The disabling circuit 10 may further include electric components for tuning the system to perform based upon the operating conditions of the power distribution box 100. For example, the second latching circuit 28 may also include a second voltage divider (30) interposed between the fourth input (26) and the fourth transistor (T4). The second voltage divider 30 may include a fifth resistor (R5) and a sixth resistor (R6) connected at a seventh node (N7) disposed on electric line (L3), wherein one end of the sixth resistor (R6) is connected to the seventh node (N7) and the other end of the sixth resistor (R6) is connected to ground. The second latching circuit 28 may further include a seventh resistor (R7) disposed on electric line (L3) and interposed between the fourth transistor (T4) and the fifth transistor (T5). The seventh resistor (R7) may function as a biasing resistor for the fifth transistor (T5) and limit current to the fifth transistor (T5). The second latching circuit 28 may further include a third capacitor (C3) disposed on a portion of electric line (L3) extending between the battery 102 and the base (T5B) of the fifth transistor (T5). The third capacitor (C3) is configured to filter noise for the fifth transistor (T5). The first latching circuit 20 may further include an eighth resistor (R8) disposed on electric line (L2) and interposed between the fourth node (N4) and the second transistor (T2). The first latching circuit 20 may further include a ninth resistor (R9) connected in parallel with a tenth resistor (R10) at an eighth node disposed on electric line (L2) and interposed between the second transistor (T2) and the third transistor (T3). The disabling circuit 10 may further include a fourth capacitor (C4) connected to electric line (L1) at an eighth node (N8), the fourth capacitor (C4) configured to filter noise for the first transistor (T1).

With reference now to FIGS. 3-5 an operation of the power distribution box 100 is provided. With reference first to FIG. 3, an input to actuate the horn is transmitted to the power distribution box 100 wherein a first actuation signal from the a button located on the steering wheel of the vehicle, for example, is transmitted from the first input 12 to the output path 16 and the second actuation signal, which may be initiated from the key fob is transmitted to the microcontroller 108, wherein the microcontroller 108 transmits a signal from the second input 14 to the output path 16, as indicated by the arrows, actuating the horn. In this condition, the first transistor (T1) is open and thus the first actuation signal from the external device 106 and the second actuation from the microcontroller 108 are transmitted along the output path 16 so as to power and actuate the electric device 104.

With reference now to FIG. 4, an operation of the first latching circuit 20 is provided. The microcontroller 108 transmits a pulsed signal along the third input 22 after a predetermined period of time wherein the second or first actuation signal is transmitted repeatedly along the second input 14 or first 12. Thus, the microcontroller 108 determines that the key fob is stuck in the on position and the microcontroller 108 actuates the first latching circuit 20. The pulsed signal is transmitted along a first electric path (P1), turns on the first transistor (T1), and charges the first capacitor (C1). When the first capacitor (C1) is charged, a voltage potential is generated between a base of the second transistor (T2) and an emitter of the second capacitor (C2) turning on the second transistor (T2). When the second transistor (T2) is turned on, a second electric path is (P2) created from the battery 102 to ground so as to create a voltage potential between a base of the third transistor (T3) and an emitter of the third transistor (T3), turning on the third transistor (T3). When the third transistor (T3) is turned on, a third electric path (P3) is created from the battery 102 to ground, wherein the first capacitor (C1) is charged and retains the voltage potential between the base (T1B) and emitter (T1E) of the first transistor (T1) keeping the first transistor (T1) on. When the first transistor (T1) is on, the first and second actuation signals are grounded.

With reference now to FIG. 5, an operation of the second latching circuit 28 is provided. In this instance, the microcontroller 108 determines that a reset is needed. In other words, the first latching circuit 20 may be turned off so as to be turned on later. Such a reset may be based upon various conditions, such as the vehicle being turned off and back on, or after a predetermined period of time. The microcontroller 108 transmits a pulse signal to the second latching circuit 28, wherein the pulse signal is transmitted along a fourth electric path (P4) which turns on the fourth transistor (T4), wherein the voltage from the battery 102 is grounded. When the fourth transistor (T4) is on, a fifth electric path (P5) is created between the battery 102 and ground through the fourth transistor (T4), and a voltage potential is generated between the emitter (T5E) and the base (T5B) of the fifth transistor (T5) turning on the fifth transistor (T5). When the fifth transistor (T5) is turned on the voltage at the fourth node (N4) is equal to the voltage at the first battery node (BN1). Thus, the voltage at the emitter (T3E) and the base (T3B) of the third transistor (T3) is the same and the third transistor (T3) is turned off. When the third transistor (T3) is turned off, the first capacitor (C1) and the fourth capacitor (C4) are allowed to discharge to ground turning off the first transistor (T1) and the second transistor (T2).

It should be appreciated that the value and construction of the known elements such as the resistors, capacitors and transistors are beyond the scope of the disclosure and such components may be modified and adapted for use herein based the operating conditions of the system, e.g. the voltage of the battery 102, the current and voltage thresholds of the microcontroller 108, the operating parameters of the electric device 104 and the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A circuit for disabling an electric device that is stuck in an active state, the circuit disposed in a power distribution box, the power distribution box configured to supply power from a battery to the electric device, the power distribution box having a microcontroller configured to transmit a pulsed signal, the circuit comprising:
    a first input for receiving a first actuation signal from an external device for actuating the electric device;
    a second input for receiving a second actuation signal from the microcontroller for powering the electric device, the second input connected in parallel with the first input at a first node;
    an output path connected to the first input and the second input at a second node downstream the first node, the output path for transmitting the first actuation signal and the second actuation signal to the electric device;
    a grounding path connected to the first input and the second input at the first node and in parallel with the output path, the grounding path for transmitting the first actuation signal and the second actuation signal to ground;
    a first transistor having a base, a collector and an emitter, the first transistor electrically connected to the grounding path and interposed between the first node and the ground, the first transistor configured to be activated by a first voltage potential between the base and the emitter of the first transistor; and
    a first latching circuit coupled to the battery, wherein the first latching circuit is configured to receive the pulsed signal from the microcontroller and ground the first actuation signal and the second actuation signal along the grounding path so as to disable the electric device and retain the first voltage potential between the base and emitter of the first transistor so as to keep the first transistor on.

2. The circuit as set forth in claim 1, further including a third input for receiving the pulsed signal from the microcontroller and a first diode interposed between the third input and the first transistor.

3. The circuit as set forth in claim 1, wherein the first latching circuit includes a second transistor, a third transistor a, first capacitor, and a second capacitor, the third transistor having an emitter connected to the battery and a collector connected to ground, the pulsed signal charging the first capacitor and generating a second voltage potential between a base of the second transistor and an emitter of the second capacitor turning on the second transistor, the second transistor creating a first electric path from the battery to ground so as to create a third voltage potential between a base of the third transistor and an emitter of the third transistor so as to turn on the third transistor creating a second electric path from the battery to ground wherein the first capacitor is charged and retaining the first voltage potential between the base of the first transistor and an emitter of the first transistor keeping the first transistor on.

4. The circuit as set forth in claim 3, further wherein the second capacitor is interposed between the emitter of the third transistor and the collector of the second transistor.

5. The circuit as set forth in claim 4, wherein the third transistor includes a pair of first biasing resistors connected in parallel with each other and the base of the third transistor.

6. The circuit as set forth in claim 3, further including a fourth input for receiving the pulsed signal from the microcontroller.

7. The circuit as set forth in claim 6, further including a second latching circuit configured to process the pulsed signal to turn off the first transistor.

8. The circuit as set forth in claim 7, wherein the second latching circuit includes a fourth transistor and a fifth transistor, the fifth transistor having an emitter coupled to the battery, a collector coupled to ground and a base coupled to the fourth transistor, the fourth transistor having a base configured to receive the pulsed signal so as to generate a fourth voltage potential between the base and an emitter of the fourth transistor to turn on the fourth transistor, creating a third electric path for grounding the battery, and generate a fifth voltage potential between the emitter of the fifth transistor and the base of the fifth transistor, turning on the fifth transistor and turning off the first transistor, the second transistor and the third transistor.

9. The circuit as set forth in claim 8, wherein the fifth transistor includes a pair of second biasing resistors connected in parallel with each other and the base of the fifth transistor.

10. The circuit as set forth in claim 9, wherein the second latching circuit includes a first voltage divider interposed between the fourth input and the fourth transistor.

11. A power distribution box for distributing power from a battery to an electric device, the power distribution box comprising:
    a first input for receiving a first actuation signal from an external device for actuating the electric device;
    a microcontroller configured to transmit a pulsed signal and a second actuation signal;
    a second input for receiving the second actuation signal from the microcontroller for powering the electric device, the second input connected in parallel with the first input at a first node; and
    a disabling circuit for disabling an electric connection to the electric device, the disabling circuit including a first input, a second input, an output path, a grounding path, a first transistor, and a first latching circuit;
    wherein the output path is connected to the first input and the second input at a second node downstream the first node;
    wherein the output path transmits the first actuation signal and the second actuation signal to the electric device;
    wherein the grounding path is connected to the first input of the power distribution box and the second input of the power distribution box at the first node and in parallel with the output path, the grounding path transmitting the first actuation signal and the second actuation signal to ground;
    wherein the first transistor includes a base, a collector and an emitter, the first transistor is electrically connected to the grounding path and interposed between the first node and the ground, the first transistor configured to be activated by a first voltage potential between the base of the first transistor and the emitter of the first transistor, wherein the first latching circuit is coupled to the battery, wherein the first latching circuit is configured to receive the pulsed signal from the microcontroller and ground the first actuation signal and the second actuation signal along the grounding path so as to disable the electric device and retain the first voltage potential between the base of the first transistor and the emitter of the first transistor so as to keep the first transistor on.

12. The power distribution box as set forth in claim 11, further including a third input for receiving the pulsed signal from the microcontroller and a first diode interposed between the third input and the first transistor.

13. The power distribution box as set forth in claim 11, wherein the first latching circuit includes a second transistor, a third transistor, a first capacitor, and a second capacitor, the third transistor having an emitter connected to the battery and a collector connected to ground, the pulsed signal charging the first capacitor and generating a second voltage potential between a base of the second transistor and an emitter of the second capacitor turning on the second transistor, the second transistor creating a first electric path from the battery to ground so as to create a third voltage potential between a base of the third transistor and an emitter of the third transistor so as to turn on the third transistor creating a second electric path from the battery to ground wherein the first capacitor is charged and retaining the first voltage potential between the base of the first transistor and an emitter of the first transistor, keeping the first transistor on.

14. The power distribution box as set forth in claim 13, wherein the second capacitor is interposed between the emitter of the third transistor and the collector of the second transistor.

15. The power distribution box as set forth in claim 14, wherein the third transistor includes a pair of first biasing resistors connected in parallel with each other and the base of the third transistor.

16. The power distribution box as set forth in claim 13, further including a fourth input for receiving the pulsed signal from the microcontroller.

17. The power distribution box as set forth in claim 16, further including a second latching circuit configured to process the pulsed signal to turn off the first transistor.

18. The power distribution box as set forth in claim 17, wherein the second latching circuit includes a fourth transistor and a fifth transistor, the fifth transistor having an emitter coupled to the battery, a collector coupled to ground and a base coupled to the fourth transistor, the fourth transistor having a base configured to receive the pulsed signal so as to generate a fourth voltage potential between the base and an emitter of the fourth transistor to turn on the fourth transistor, creating a third electric path for grounding the battery and generate a fifth voltage potential between the emitter of the fifth transistor and the base of the fifth transistor, turning on the fifth transistor and turning off the first transistor, the second transistor and the third transistor.

19. The power distribution box as set forth in claim 18, wherein the fifth transistor includes a pair of second biasing resistors connected in parallel with each other and the base of the fifth transistor.

20. The power distribution box as set forth in claim 19, wherein the second latching circuit includes a first voltage divider interposed between the fourth input and the fourth transistor.

* * * * *